United States Patent
Grayson

(10) Patent No.: US 12,454,827 B2
(45) Date of Patent: Oct. 28, 2025

(54) DOWNSPOUT EXTENSION SYSTEM, KIT, AND METHOD

(71) Applicant: CRUSHPROOF TUBING CO., McComb, OH (US)

(72) Inventor: J. Todd Grayson, McComb, OH (US)

(73) Assignee: J. Todd Grayson, McComb, OH (US)

( * ) Notice: Subject to any disclaimer, the term of this patent is extended or adjusted under 35 U.S.C. 154(b) by 127 days.

(21) Appl. No.: 18/301,676

(22) Filed: Apr. 17, 2023

(65) Prior Publication Data

US 2023/0332411 A1   Oct. 19, 2023

Related U.S. Application Data

(60) Provisional application No. 63/331,421, filed on Apr. 15, 2022.

(51) Int. Cl.
*E04D 13/08* (2006.01)

(52) U.S. Cl.
CPC ...... *E04D 13/08* (2013.01); *E04D 2013/0806* (2013.01)

(58) Field of Classification Search
CPC .... E04D 2013/0806; E04D 2013/0813; E04D 13/08; E04H 12/2276
See application file for complete search history.

(56) References Cited

U.S. PATENT DOCUMENTS 2,814,529 A * 11/1957 Arnt .......................... B05B 1/20
239/533.13

2,975,805 A     3/1961 Horn
3,904,121 A *  9/1975 Geagan ................. E04D 13/08
239/282

(Continued)

FOREIGN PATENT DOCUMENTS

| IT | 0079417 A1 * | 5/1983 | |
| WO | WO-2007032040 A1 * | 3/2007 | ............. E04D 13/08 |

OTHER PUBLICATIONS

Amerimax Home Products, "Flex-Drain 53127 Flexible Downspout Extension Adapter, 3 by 4 by 4-Inch, White", webpage, Amazon.com, Part No. ADP53129, Item model No. 53127, Asin B008BGZ9NS, May 22, 2012, US.

(Continued)

*Primary Examiner* — Adriana Figueroa
(74) *Attorney, Agent, or Firm* — Jacob M. Ward; Ward Law Office LLC

(57) ABSTRACT

A downspout extension system for a terminal end of a downspout is provided. The downspout extension system can include a collar member, an enclosure member, and an extension member. The collar member can include a first end being open and a second end being closed. The collar member can include a first tab disposed directly across from a second tab. The enclosure member can be selectively slidably disposed in the first end of the collar member. The extension member can be disposed on the collar member. The extension member can include a first aperture configured to receive the first tab and a second aperture configured to receive the second tab. The collar member and the enclosure member can together be configured to receive the terminal end of the downspout and to securely hold the terminal end between the collar member and the enclosure member with mechanical force.

19 Claims, 5 Drawing Sheets

(56) References Cited

U.S. PATENT DOCUMENTS

| | | | | |
|---|---|---|---|---|
| 5,358,006 A | * | 10/1994 | Sweers | F16L 27/00 |
| | | | | 52/16 |
| 5,511,829 A | * | 4/1996 | Sicotte | E03F 1/002 |
| | | | | 52/16 |
| 5,658,092 A | * | 8/1997 | Sweers | E03F 1/002 |
| | | | | 52/16 |
| 5,673,519 A | | 10/1997 | McCaughan | |
| 6,223,777 B1 | | 5/2001 | Smith et al. | |
| D452,915 S | * | 1/2002 | Kieffer | D25/122 |
| D521,656 S | * | 5/2006 | Terrels | D25/122 |
| 7,207,614 B2 | | 4/2007 | Briggs | |
| 8,006,720 B1 | * | 8/2011 | Kotansky | E04D 13/08 |
| | | | | 52/16 |
| 8,607,827 B2 | * | 12/2013 | Bell | F16L 9/006 |
| | | | | 138/119 |
| 8,689,837 B1 | * | 4/2014 | Smith | F16L 11/121 |
| | | | | 285/179 |
| 8,864,180 B2 | | 10/2014 | Harman et al. | |
| 9,091,071 B2 | * | 7/2015 | Crawford | E04D 13/08 |
| D776,796 S | * | 1/2017 | Denooy | D23/262 |
| D790,043 S | * | 6/2017 | Stout | D23/262 |
| 10,273,695 B2 | * | 4/2019 | Veldhoff | F16L 3/1016 |
| 2004/0040219 A1 | * | 3/2004 | Bacik | E04D 13/0643 |
| | | | | 52/16 |
| 2007/0046021 A1 | * | 3/2007 | Crawford | E04D 13/08 |
| | | | | 285/226 |
| 2012/0049511 A1 | | 3/2012 | Bell et al. | |
| 2012/0125465 A1 | * | 5/2012 | Bell | F16L 9/006 |
| | | | | 138/37 |
| 2012/0247580 A1 | * | 10/2012 | Guinyard | E04D 13/08 |
| | | | | 138/109 |
| 2016/0033048 A1 | * | 2/2016 | Noah | F16K 11/0525 |
| | | | | 137/625.45 |

OTHER PUBLICATIONS

Amerimax Home Products, "Flex-A-Spout Brown Vinyl Downspout Extension", webpage, Homedepot.com, US.

Genova, "Genova Universal Downspout Extender: 19 in to 55 in Lg, PVC, Green", webpage, Grainger.com, Item 34CE16, Mfr. Model AG575, UNSPSC 40141705, US.

Spectra, "Spectra Universal Downspout Extension Black Polymer 24-in Black Downspout Extension", webpage, Lowes.com, Item No. 2592954, Model No. GRNDSPTBK, US.

* cited by examiner

DOWNSPOUT EXTENSION SYSTEM, KIT, AND METHOD

CROSS-REFERENCE TO RELATED APPLICATIONS

This application claims the benefit of U.S. Provisional Application No. 63/331,421, filed on Apr. 15, 2022. The entire disclosure of the above application is incorporated herein by reference.

FIELD

The present technology relates to a downspout extension and, more particularly, a system, a kit, and a method for extending a downspout.

INTRODUCTION

This section provides background information related to the present disclosure which is not necessarily prior art.

A downspout extension acts as a rain diffusion accessory. A downspout extension may be added onto the existing gutter system of a building to allow the water to fall to the ground in a controlled way. The water may then be diverted away from the foundation and structure of the building.

Most downspout extensions attach to the terminal end of a downspout with the use of a screw for a mechanical connection or inwardly directed protrusions that create a friction fit. Using a screw to install a downspout extension requires tools that some users may not already have (such as a screwdriver, a drill, or self-tapping screws), creates a catch point for leaves and other debris, and is also prone to stripping out of sidewall of the downspout. Inwardly directed protrusions or similar friction fit designs do not provide enough compression force to hold due to the smooth, hard material of both the spout and downspout extension. Both attachment methods add to the inconvenience of using a downspout extension. Further, these downspout extensions can easily break when being removed for winter and reinstalled in the spring due to the fragile nature of the thin plastic they are typically formed of. To this point, where the friction fit of the single piece downspout extension provides for easy removal, the downspout extension can fall off with heavy rainfall or Downspout extensions are often manufactured in a particular size, which requires the user to know their downspout size before purchasing a downspout extension or require the use of a knife to cut off one section to reveal another. For example, downspout extensions come ready to fit onto a 3×4 downspout end and may also neck down to a 2×3 size, so if the user requires a 2×3 downspout extension, they must use a knife to cut off the 3×4 downspout extension and reveal the 2×3 connection. This is not only time consuming but can also be dangerous as a utility knife can easily slip while cutting hard plastic material and the resulting sharp, jagged plastic edge produced by cutting the downspout extension to fit is a longer-term cut, scrape, and snagging hazard. Further, these designs limit the variety of downspout sizes that the downspout extension can be used with.

Accordingly, there is a continuing need for a downspout extension that can overcome the aforementioned problems. Desirably, the downspout extension would provide a superior hold onto an end of a downspout and provide an easily selectable or customizable fit relative to existing products on the market. It would also adapt well to misshapen or out-of-square downspouts as these are very common, and would not require any tools or other items to complete the installation. Finally, easy future removal and reattachment would be useful because gutter systems can get clogged and this would assist in easy cleaning.

SUMMARY

In concordance with the instant disclosure, a downspout extension apparatus that will provide superior attachment, removal, durability, and flow rate to an end of a downspout, has surprisingly been discovered.

In one embodiment, a downspout extension system for a terminal end of a downspout is provided. The downspout extension system can include a collar member, an enclosure member, and an extension member. The collar member can have a first end being open and a second end being closed. The collar member can have a first tab and a second tab being disposed directly across from each other. The enclosure member can be selectively slidably disposed in the first end of the collar member. The extension member can be disposed on the collar member. The extension member can have a first aperture configured to receive the first tab and a second aperture configured to receive the second tab. The collar member and the enclosure member can be configured to cooperate and receive the terminal end of the downspout and securely hold the terminal end between the collar member and the enclosure member with mechanical force.

In another embodiment, a downspout extension kit for a terminal end of a downspout is provided. The downspout extension system can include a collar member, an enclosure member, an extension member, and an affixing member. The collar member can have a first end being open and a second end being closed. The collar member can have a first tab and a second tab being disposed directly across from each other. The enclosure member can be selectively slidably disposed in the first end of the collar member. The extension member can be disposed on the collar member. The extension member can have a first aperture configured to receive the first tab and a second aperture configured to receive the second tab. The affixing member can be configured to be disposed on at least one of the collar member and the enclosure member. The collar member and the enclosure member can be configured to cooperate and receive the terminal end of the downspout and securely hold the terminal end between the collar member and the enclosure member with mechanical force.

In a further embodiment, a method of assembling a downspout extension system on a terminal end of a downspout is provided. The downspout extension system of the present disclosure can be provided along with a downspout for a building. The affixing member can be pressed onto one of or both of the collar member and the enclosure member. The collar member can be placed around the terminal end of the downspout. The enclosure member can be coupled to the collar member and slid toward the collar member to securely hold the terminal end between the collar member and the enclosure member with mechanical force. The first tab can be inserted into the first aperture and the second tab can be inserted into the second aperture whereby the extension member is secured to the collar member and the downspout extension system installed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
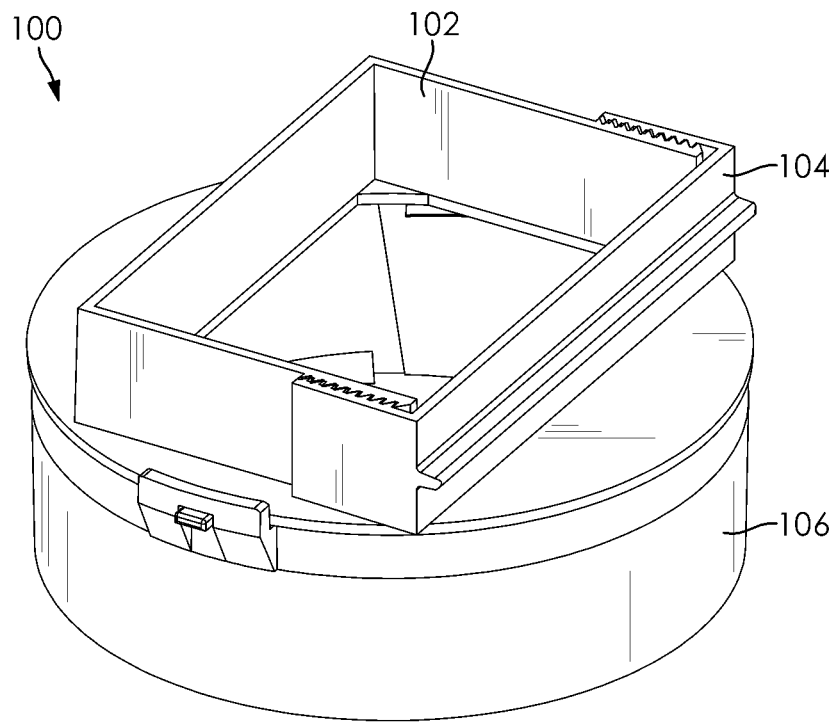
FIG. 1 is a top perspective view of an embodiment of a downspout extension system including a collar member, an enclosure member, and an extension member.

The following description of technology is merely exemplary in nature of the subject matter, manufacture, and use of one or more inventions; is not intended to limit the scope, application, or uses of any specific invention claimed in this application or in such other applications as may be filed claiming priority to this application; or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology provides a downspout extension system 100 for a downspout 101, specifically, a terminal end 103 of a downspout 101, as shown generally in FIGS. 1-8. Desirably, the downspout extension system 100 directs water away from the surface directly under the downspout 101 and disburses the water away from a building structure. Advantageously, the downspout extension system 100 can militate against excess water collecting and provide improved drainage.

As shown in FIG. 1, the downspout extension system 100 can include a collar member 102, an enclosure member 104, and an extension member 106. The collar member 102 and the enclosure member 104 can together be configured to cooperate and receive the terminal end 103 of the downspout 101 and to securely hold the terminal end 103 between the collar member 102 and the enclosure member 104 with mechanical force. The extension member 106 can further include a duct 108 configured to direct water from the downspout 101 away from the downspout 101.

Figure 2:
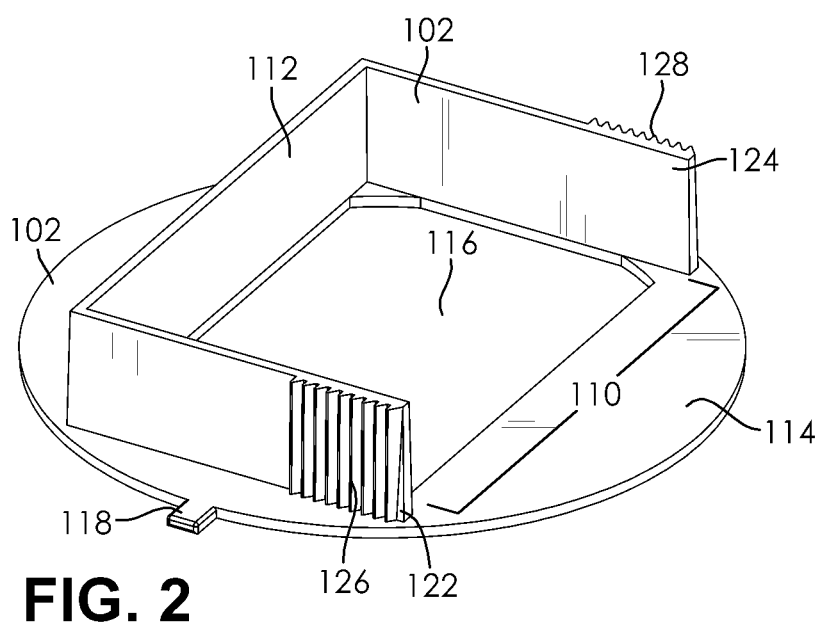
FIG. 2 is a top perspective view of the collar member of the downspout extension system.
Figure 3:
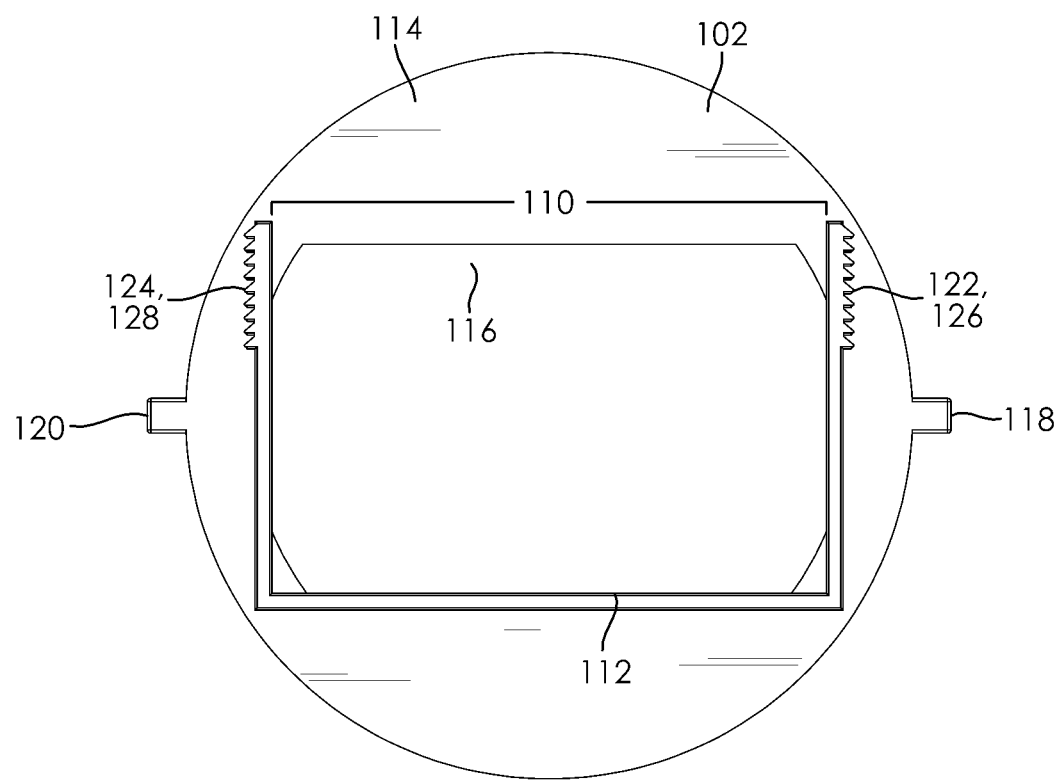
FIG. 3 is a top plan view thereof.

As shown in FIGS. 2-3, the collar member 102 can include a first end 110 and a second end 112. The first end 110 can be open and configured to accept the enclosure member 104 while the second end 112 can be closed and be disposed adjacent to a side of the downspout 101. The area between the first end 110 and the second end 112 can be open to accommodate and conform to the terminal end 103 of the downspout 101 when disposed therein. With particular reference to FIG. 2, the collar member 102 can include a guard 114 that acts as a bottom portion of the collar member 102. The guard 114 can be disposed around the perimeter of the collar member 102 and can be configured to cover the perimeter of the extension member 106. The size and shape of the guard 114 can be tailored to accommodate a predetermined cross-sectional transition between the collar member 102 (incl. the downspout 101 cross-section) and the duct 108. In this way, the guard 114, in conjunction with the remainder of the downspout extension system 100, can provide a substantially closed junction between the downspout 101 and the duct 108. The guard 114 can have an area that extends beyond the first end 110 and the second end 112 of the collar member 102. The guard 114 can extend outwardly from the collar member 102 to any circumference necessary to cover the opening of the duct 108. Advantageously, the guard 114 militates against debris such as leaves, dirt, and rocks, as well as small animals and insects from entering the downspout extension system 100. A skilled artisan can select a suitable circumference within the scope of the present disclosure.

It should be appreciated that, as shown in FIG. 2, the collar member 102 can have the opening 116 extending through the extension member 106 to allow for liquid to flow through the downspout extension system 100. Advantageously, the opening 116 can also allow for debris that enters the downspout 101 to freely flow out of the downspout 101. Further, the opening 116 can militate against the downspout extension system 100 becoming blocked or clogged and backing up an entire drainage system.

The collar member 102 can also include a first tab 118 and a second tab 120, shown in FIG. 3, disposed directly across from each other. The first tab 118 and the second tab 120 can each be disposed on an edge of the guard 114 and extend outwardly from the guard 114 in opposite directions. As shown in FIG. 3, the collar member 102 can include two tabs; however, the collar member 102 can include a plurality of tabs, as determined by a skill artisan, to secure the collar member 102 to the extension member 106.

With reference to FIGS. 2-3, the collar member 102 can include a first terminus 122 and a second terminus 124. The first terminus 122 and the second terminus 124 can be disposed substantially across from each other. The first terminus 122 can have first exterior teeth 126 and the second terminus 124 can have second exterior teeth 128. The first exterior teeth 126 and the second exterior teeth 128 can be disposed on opposite sides of the collar member 102 and can be configured to accept the enclosure member 104. A skilled artisan can select a suitable position along the first terminus 122 and the second terminus 124 for the first exterior teeth 126 and the second exterior teeth 128 to allow for the collar member 102 to accept the enclosure member 104.

Figure 5A:
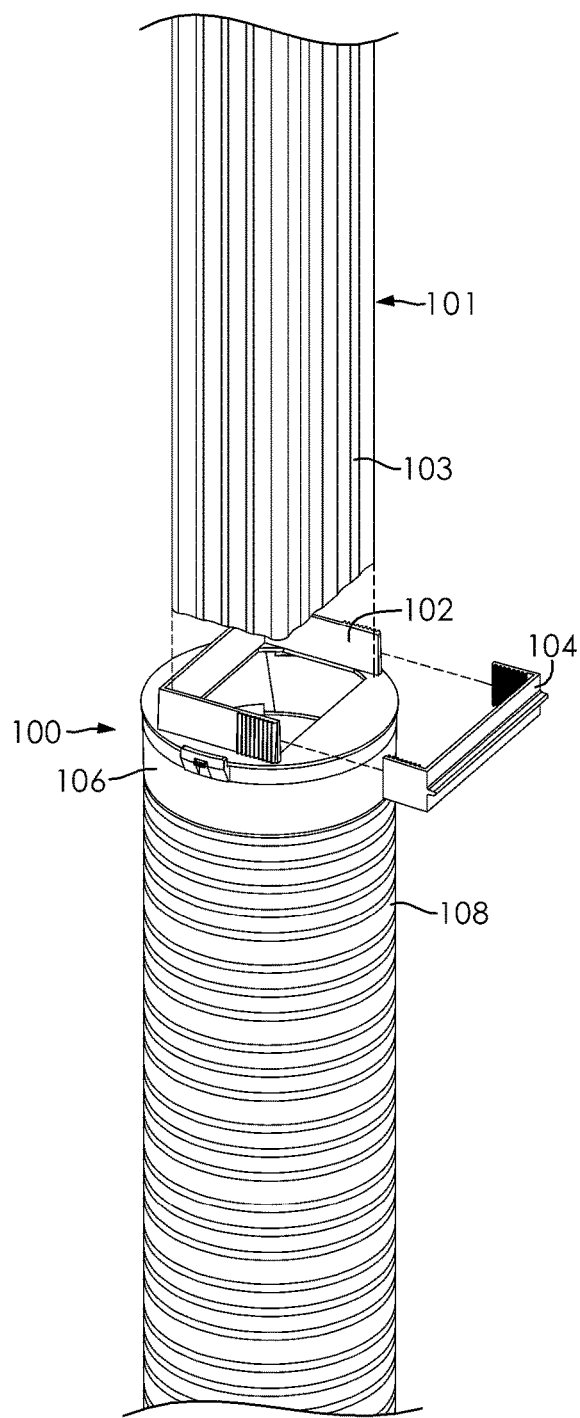
FIG. 5A-5B are stepwise environmental views of the downspout extension system being installed on a terminal end of a downspout.
Figure 5B:
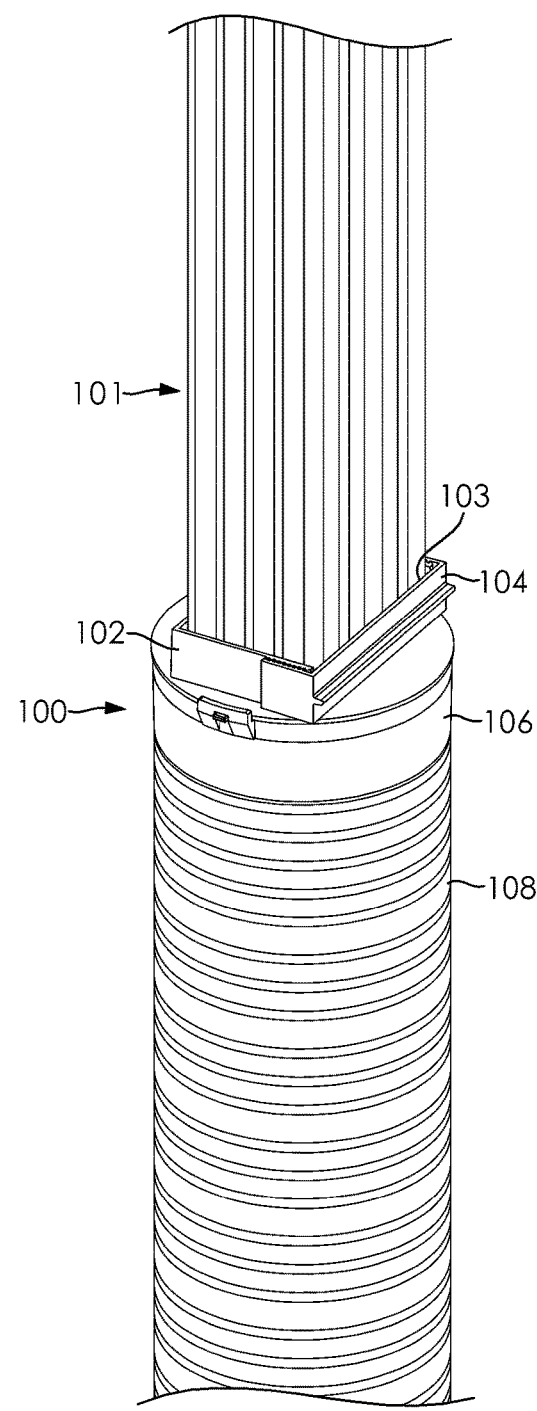
Figure 6:
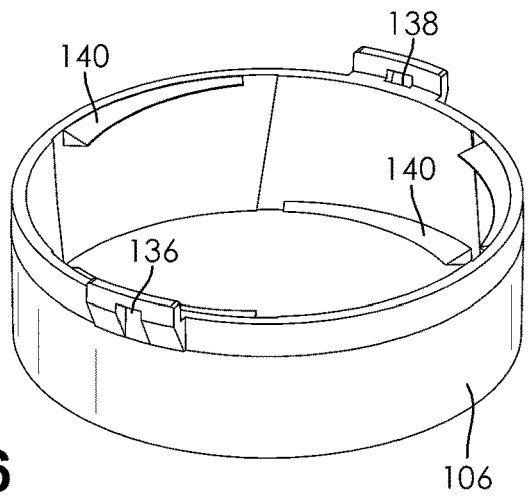
FIG. 6 is a top perspective view of the extension member of the downspout extension system.

With reference to FIGS. 1 and 5A-5B, the enclosure member 104 can be selectively slidably disposed to enclose the first end 110 of the collar member 102. As discussed hereinabove, the collar member 102 and the enclosure member 104 can together be configured to receive the terminal end 103 of the downspout 101 and to securely hold the terminal end 103 between the collar member 102 and the enclosure member 104 with mechanical force.

Figure 4:
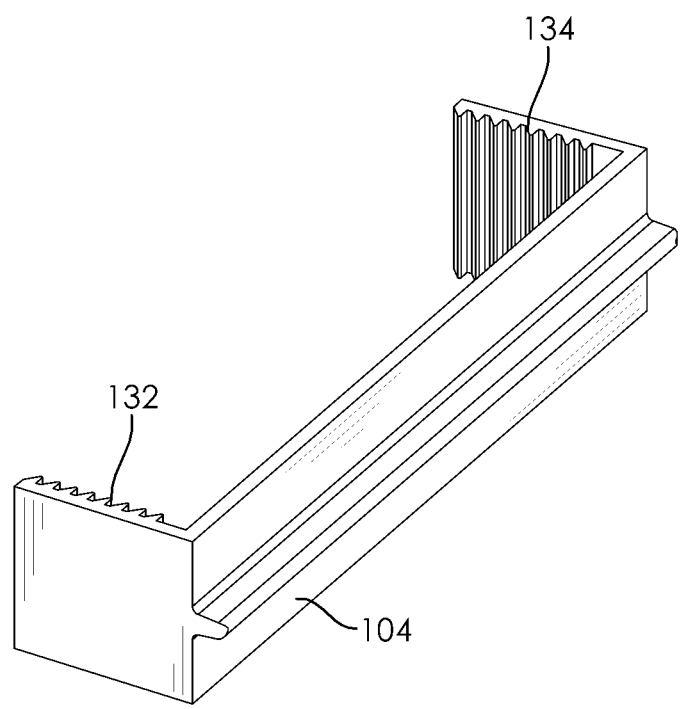
FIG. 4 is a top perspective view of the enclosure member of the downspout extension system.

With continued reference to FIG. 4, the enclosure member 104 can have first interior teeth 132 and second interior teeth 134. The first interior teeth 132 and the second interior teeth 134 can be disposed directly across from each other. The first interior teeth 132 of the enclosure member 104 can selectively slidably correspond with the first exterior teeth 126 of the collar member 102 and the second interior teeth 134 of the enclosure member 104 can selectively slidably correspond with the second exterior teeth 128 of the collar member 102.

Figure 7:
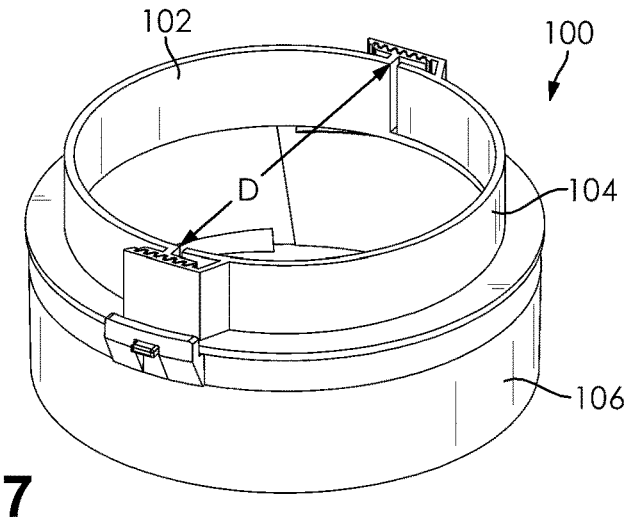
FIG. 7 is a top perspective view of an embodiment of a downspout extension system configured for a cylindrical downspout.

The collar member 102 and enclosure member 104 can be any shape to correspond with the terminal end 103 of the downspout 101. As a non-limiting example, the collar member 102 and enclosure member 104 can cooperate to form a rectangular cross-sectional shape when selectively slidably coupled to correspond with a rectangular cross-sectional terminal end 103 of the downspout 101, as shown in FIGS. 5A-5B. Alternatively, the collar member 102 and enclosure member 104, when selectively slidably coupled, can be configured to cooperate and form a circular cross-section to correspond with a circular cross-sectional terminal end 103 of the downspout 101, as shown in FIG. 7. A skilled artisan can select a suitable shape for the collar member 102 and the enclosure member 104 when selectively slidably coupled to correspond with the terminal end 103 of the downspout 101 within the scope of the present disclosure.

The downspout extension system 100 can be configured to receive the terminal end 103 of a downspout 101 of various dimensions. As a non-limiting example, the downspout extension system 100 can be configured to receive a downspout 101 with a width of about 2 inches and a length of about 3 inches. Alternatively, the downspout extension system 100 can be configured to receive a downspout 101 with a width of about 3 inches and a length of about 4 inches. Advantageously, the adaptability of the downspout extension system 100 to receive downspouts 101 with various lengths or widths provides flexibility and versatility. A skilled artisan can select a suitable length and width for the collar member 102 and enclosure member 104 such that they securely hold the terminal end 103 between the collar member 102 and the enclosure member 104 with mechanical force within the scope of the present disclosure.

It should be appreciated that in certain embodiments where the collar member 102 and enclosure member 104 form a circular cross-section to securely hold the terminal end 103 of a cylindrical downspout 101, the downspout extension system 100 can have a diameter (D), shown in FIG. 7. As a non-limiting example, the diameter (D) can be between about 3 inches and about 6 inches. A skilled artisan can select a suitable diameter (D) for the downspout extension system 100 within the scope of the present disclosure.

As previously described, the extension member 106 can be disposed on the collar member 102 and form a seal with the extension member 106 by abutting the collar member 102. Advantageously, the fluid tight seal between the extension member 106 and the collar member 102 can militate against liquid leaking from the downspout extension system 100 before it reaches the duct and is directed away from the downspout 101.

The extension member 106 can include a first aperture 136 and a second aperture 138. The first aperture 136 can be configured to receive the first tab 118 of the collar member 102 and the second aperture 138 can be configured to receive the second tab 120 of the collar member 102. The user can insert the first tab 118 into the first aperture 136 and the second tab 120 into the second aperture 138 to secure the extension member 106 to the collar member 102. Desirably, the tabs 118, 120 of the collar member 102 being secured to the apertures 136, 138 of the extension member 106 can secure the extension member 106 to the collar member 102 and maintain the seal. The extension member 106 can include any number of apertures that correspond with any number of tabs disposed on the collar member 102 to promote the seal between the collar member 102 and the extension member 106. A skilled artisan can select a suitable number of tab and aperture couples to promote a seal within the scope of the present disclosure.

The extension member 106 can be configured to attach to the duct 108 to convey liquid passing through the downspout extension system 100, as shown in FIGS. 5A-5B. The duct 108 can be corrugated to allow the duct to be flexible to direct the liquid in a desired direction. The extension member 106 can be cylindrical in shape to accommodate the corrugated duct. Further, the extension member 106 can be configured to attach to the duct 108 of any length. A skilled artisan can select a suitable type of duct 108 and duct length within the scope of the present disclosure.

The duct 108 can be formed separately from the collar member 102, the enclosure member 104, and the extension member 106. Advantageously, this can allow for the user to select a duct 108 formed of a material best suited for the needs of the user. Additionally, the shape of the duct 108 can be varied to best suit the needs of the user and the downspout 101. Further, the duct 108 can be formed of a different material than that of the collar member 102, the enclosure member 104, and the extension member 106. Advantageously, this can allow for the user to select a more flexible material than the material selected for the collar member 102, for example.

The extension member 106 can include threads 140 configured to threadably couple and secure the extension member 106 and the duct 108. Advantageously, the threads 140 can provide for a seal between the extension member 106 and the duct 108. A skilled artisan can select a suitable means for coupling the extension member 106 and the duct 108.

The collar member 102, the enclosure member 104, and the extension member 106 of the downspout extension system 100 can be formed of a solid material. The solid material can allow for the downspout extension system 100 to be stable and durable as it is weathered from the outdoors. As non-limiting examples, the downspout extension system 100 can be formed from various polyolefins and mixtures thereof, polypropylene, high density polyethylene (HDPE), and/or polyethylene terephthalate (PET). One of ordinary skill in the art can select other suitable materials for forming the downspout extension system 100 within the scope of the present disclosure.

In a more specific example, the collar member 102, enclosure member 104, and extension member 106 of the downspout extension system 100 can be injection molded, with each of the collar member 102, the enclosure member 104, and the extension member 106 being produced as a separate component formed of the same material. For example, the collar member 102 can be injection molded and formed by a single piece of plastic or metal. In another exemplary embodiment, the collar member 102, the enclosure member 104, and the extension member 106 can be formed using blow molding, roto-molding, or any other suitable means for forming plastic. A skilled artisan can select a suitable material for which the components are formed within the scope of the present disclosure.

Figure 8:
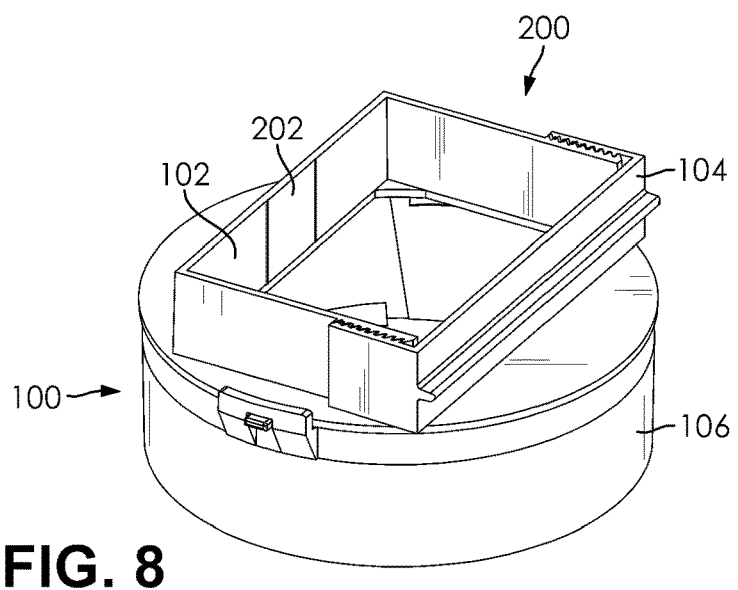
FIG. 8 is a top perspective view of an embodiment of a downspout extension kit.

The present disclosure further provides a downspout extension kit 200, shown in FIG. 8. The downspout extension kit 200 can include a downspout extension system 100 as described hereinabove. The downspout extension kit 200 can also include an affixing member 202. The affixing member 202 can be disposed on at least one of the collar member 102 and the enclosure member 104. The affixing member 202 can be made of a deformable material or adhesive. Other non-limiting examples of the affixing member 202 can include double sided tape, tacky putty, PTFE tape, texturized rubber, or hook-and-loop fastener. A skilled artisan can select a suitable material for the affixing member 202 within the scope of the present disclosure.

The affixing member 202 can create a friction force that further secures the downspout extension system 100 to the downspout 101 terminal end 103. Advantageously, the compression force and the friction force work together to create a mechanical force which secures the downspout extension system 100 to the downspout 101 terminal end 103. The mechanical force that is created by the combination of the compression force and the friction force can allow the downspout extension system 100 to fit securely with a bent or out-of-square downspout 101 terminal end 103.

Figure 9:
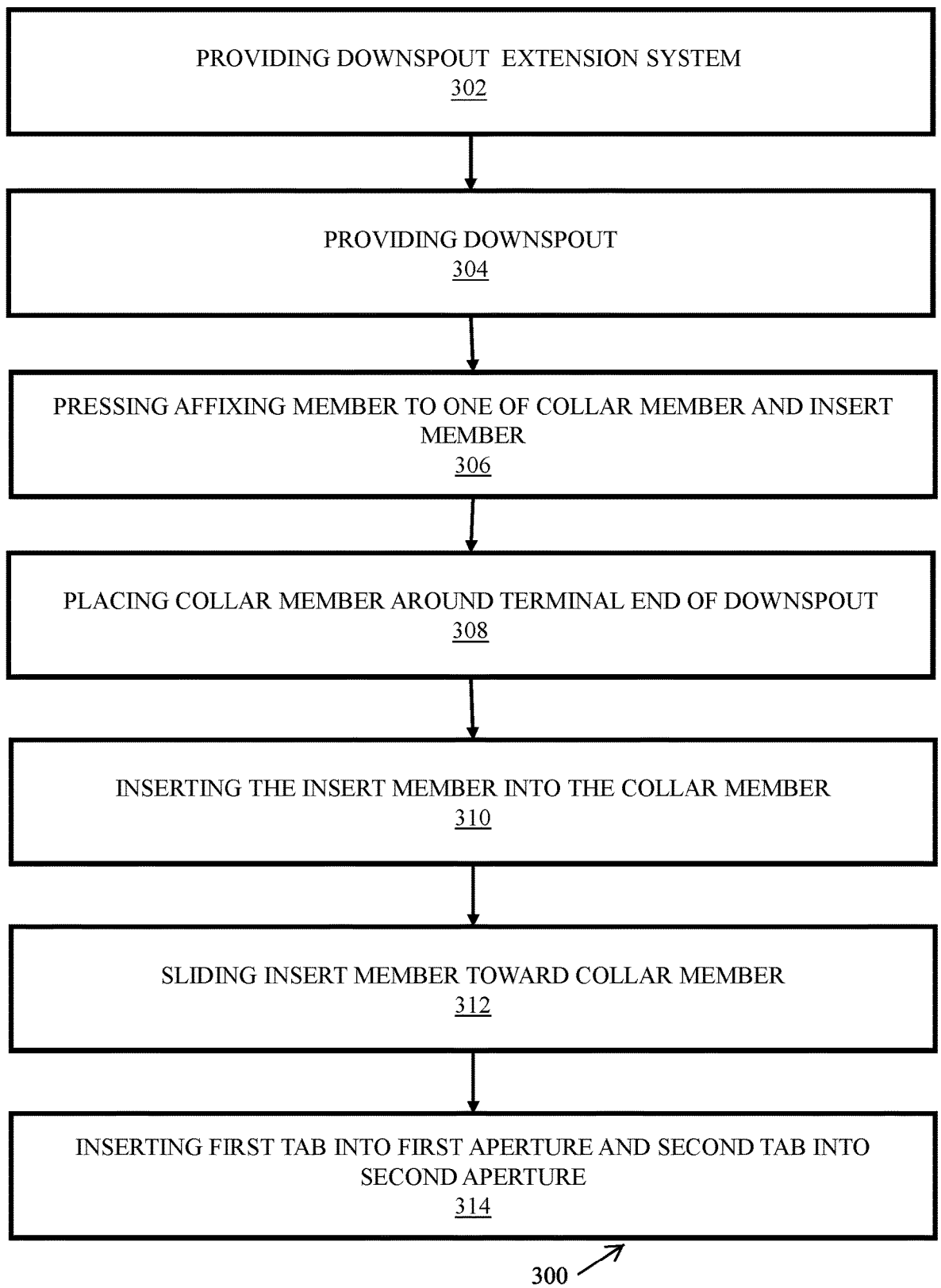
FIG. 9 is a flow diagram for an embodiment of a method of assembling a downspout extension system on a terminal end of a downspout.

The present disclosure further provides a method 300 for assembling a downspout extension kit 200, shown in FIG. 9. The method 300 can include a step 302 of providing a downspout extension kit 200 having a collar member 102, an enclosure member 104, an extension member 106 and an affixing member 202 as described hereinabove. In a step 304 of the method 300, a downspout 101 for a building can be provided. The downspout 101 can have a terminal end 103. In a step 306, the affixing member 206 can be secured to at least one of the collar member 102 and the enclosure member 104. The collar member 102 of the downspout extension system 100 can be placed around the terminal end 103 of the downspout 101 in a step 308. In a step 310, the enclosure member 104 can be coupled to the collar member 102. The enclosure member 104 can be slid toward the collar member 102 to securely hold the terminal end of the downspout 101 between the collar member 102 and the enclosure member 104 with mechanical force in a step 312. In a step 314 of the method 300, the first tab 118 of the collar member 102 can be inserted into the first aperture 136 of the extension member 106 and the second tab 120 of the collar member 102 can be inserted into the second aperture 138 of the extension member 106 whereby the extension member 106 is secured to the collar member 102.

Advantageously, the downspout extension system 100 described hereinabove can create a stable attachment with a downspout terminal end using both a compression force and a friction force to create a mechanical force. This mechanical force solves the problems currently found in the prior art.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A downspout extension system for a terminal end of a downspout comprising:
    a collar member having a first end, a second end, the first end being open and the second end being closed;
    an enclosure member configured to be selectively slidably disposed in the first end of the collar member to cooperate and receive the terminal end of the downspout and securely hold the terminal end between the collar member and the enclosure member with mechanical force; and
    an extension member configured to be coupled to the collar member, the extension member is configured to threadably engage a duct configured to convey water.

2. The downspout extension system of claim 1, wherein the collar member includes a first tab and a second tab being disposed directly across from each other.

3. The downspout extension system of claim 2, wherein the extension member includes a first aperture and a second aperture.

4. The downspout extension system of claim 3, wherein the first aperture configured to receive the first tab of the collar member, and the second aperture configured to receive the second tab of the collar member.

5. The downspout extension system of claim 1, wherein the collar member includes a first terminus and a second terminus.

6. The downspout extension system of claim 5, wherein the first terminus includes first exterior teeth and the second terminus includes second exterior teeth.

7. The downspout extension system of claim 6, wherein the enclosure member includes first interior teeth and second interior teeth.

8. The downspout extension system of claim 7, wherein the first interior teeth and the second interior teeth are disposed directly across from each other.

9. The downspout extension system of claim 8, wherein the first interior teeth of the enclosure member are configured to selectively slidably engage with the first exterior teeth of the collar member and the second interior teeth of the enclosure member are configured to selectively slidably engage with the second exterior teeth of the collar member.

10. The downspout extension system of claim 1, further including an affixing member disposed on one of the collar member and the enclosure member.

11. The downspout extension system of claim 1, wherein the extension member includes a circular cross-section configured to accommodate an end of a duct therein.

12. The downspout extension system of claim 1, wherein the collar member and the enclosure member are together configured to receive the terminal end of the downspout having a width of 2 inches and a length of 3 inches.

13. The downspout extension system of claim 1, wherein the collar member and the enclosure member are together configured to receive the terminal end of the downspout having a width of 3 inches and a length of 4 inches.

14. The downspout extension system of claim 1, wherein the extension member includes an opening extending through the extension member.

15. The downspout extension system of claim 1, wherein the collar member includes a guard configured to cover a perimeter of the extension member.

16. The downspout extension system of claim 1, wherein the collar member and the enclosure member together form a rectangular cross-section to couple with the terminal end of the downspout with a rectangular cross section.

17. The downspout extension system of claim 1, wherein the collar member and the enclosure member together form a circular cross-section to couple with the terminal end of the downspout with a circular cross-section.

18. A downspout extension system for a terminal end of a downspout comprising:
    a collar member having a first end, a second end, a first tab, a second tab, first exterior teeth, second exterior teeth, and a guard, the first tab and the second tab being disposed directly across from each other, the first end being open and the second end being closed;
    an enclosure member having first interior teeth and second interior teeth, the first interior teeth configured to selectively slidably engage with the first exterior teeth of the collar member and the second interior teeth of the enclosure member are configured to selectively slidably engage with the second exterior teeth of the collar member, the enclosure member configured to be selectively slidably disposed in the first end of the collar member to cooperate and receive the terminal end of the downspout and securely hold the terminal end between the collar member and the enclosure member with mechanical force;
    an extension member configured to be coupled to the collar member, the extension member having a first aperture and a second aperture, the first aperture configured to receive the first tab and the second aperture configured to receive the second tab, the guard of the collar member configured to cover a perimeter of the extension member; and
    a duct threadably engaged with the extension member and configured to convey water.

19. A method of assembling a downspout extension system on a terminal end of a downspout, comprising:
    providing a downspout extension system having
        a collar member having a first end, a second end, a first tab, and a second tab, the first end being open and the second end being closed, the first tab and the second tab being disposed directly across from each other;

an enclosure member that is selectively slidably disposed in the first end of the collar member, the extension member is configured to threadably engage a duct configured to convey water;

an extension member disposed on the collar member, having a first aperture, and a second aperture, the first aperture configured to receive the first tab of the collar member, and the second aperture configured to receive the second tab of the collar member; and wherein collar member and the enclosure member are together configured to receive the terminal end of the downspout and to securely hold the terminal end between the collar member and the enclosure member with mechanical force, providing a downspout for a building, the downspout having a terminal end;

placing the collar member around the terminal end;

coupling the enclosure member to the collar member;

sliding the enclosure member toward the collar member to securely hold the terminal end between the collar member and the enclosure member with mechanical force; and inserting the first tab of the collar member into the first aperture of the extension member and the second tab of the collar member into the second aperture of the extension member whereby the extension member is secured to the collar member.

* * * * *